United States Patent
Casteel

(10) Patent No.: US 9,684,328 B2
(45) Date of Patent: Jun. 20, 2017

(54) SYSTEMS AND METHODS FOR OVERVOLTAGE PROTECTION OF POWER CONVERTERS

(71) Applicant: General Electric Company, Schenectady, NY (US)

(72) Inventor: Jordan Brantley Casteel, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 1043 days.

(21) Appl. No.: 13/724,861

(22) Filed: Dec. 21, 2012

(65) Prior Publication Data

US 2014/0175882 A1 Jun. 26, 2014

(51) Int. Cl.
*G05F 3/02* (2006.01)
*H02M 1/32* (2007.01)
*H02M 5/45* (2006.01)

(52) U.S. Cl.
CPC ............... *G05F 3/02* (2013.01); *H02M 1/32* (2013.01); *H02M 5/45* (2013.01); *Y10T 307/406* (2015.04)

(58) Field of Classification Search
CPC .. G05F 3/02; H02M 1/32; H02M 5/45; Y10T 307/406
USPC ......................................................... 307/31
See application file for complete search history.

(56) References Cited

U.S. PATENT DOCUMENTS

| | | |
|---|---|---|
| 4,633,241 A | 12/1986 | Casteel et al. |
| 7,433,213 B2 | 10/2008 | Casteel et al. |
| 2004/0174648 A1* | 9/2004 | Frey .................. H02H 9/008 361/90 |
| 2008/0074910 A1* | 3/2008 | Casteel ................ H02P 9/105 363/54 |
| 2008/0239592 A1 | 10/2008 | Roscoe et al. |
| 2009/0161272 A1 | 6/2009 | Asokan et al. |
| 2009/0322083 A1 | 12/2009 | Wagoner et al. |
| 2010/0134935 A1 | 6/2010 | Ritter et al. |
| 2010/0321838 A1 | 12/2010 | Wu et al. |
| 2010/0328824 A1 | 12/2010 | Roscoe |
| 2011/0141637 A1 | 6/2011 | Klodowski |
| 2011/0141641 A1 | 6/2011 | Walling et al. |
| 2011/0204857 A1 | 8/2011 | Casteel et al. |
| 2011/0267862 A1 | 11/2011 | Roesner et al. |
| 2013/0241463 A1* | 9/2013 | Bando .................. H02P 9/007 318/810 |

OTHER PUBLICATIONS

U.S. Appl. No. 13/339,749, filed Dec. 29, 2011, Wagoner, et al.
GEI-100784B; "EX2100e Excitation Control for 35 A Regulator Systems"; Issued Oct. 22, 2010; pp. 1-32.

* cited by examiner

*Primary Examiner* — Thienvu Tran
*Assistant Examiner* — David M Stables
(74) *Attorney, Agent, or Firm* — Fletcher Yoder, P.C.

(57) ABSTRACT

A system includes an excitation system configured to regulate one or more outputs of a power generating system. The excitation system includes a power conversion module (PCM). The PCM includes a direct current (DC) link, a plurality of insulated gate bipolar transistors (IGBTs) configured to generate an output to the system, and a nonlinear resistor configured to limit a voltage of the DC link to a predetermined threshold.

20 Claims, 4 Drawing Sheets

SYSTEMS AND METHODS FOR OVERVOLTAGE PROTECTION OF POWER CONVERTERS

BACKGROUND

The subject matter disclosed herein relates to power converters, and more specifically, to overvoltage protection of power converters.

Energy and power generating systems, such as generators and distributed generators, may rely on power converters to perform various power conversion and control operations, such as electromagnetic field excitation. Excitation systems may include several configurations to provide control flexibility, but for small generator systems most generally include Insulated Gate Bipolar Transistors (IGBTs) and one or more Direct Current (DC) links from one or more ac or dc power sources to provide power output to, for example, a generator of a power generating system. The one or more DC links may be susceptible to overvoltage damage due to normal or abnormal operating conditions.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes an excitation system configured to regulate one or more outputs of a power generating system. The excitation system includes a power conversion module (PCM). The PCM includes a direct current (DC) link, a plurality of insulated gate bipolar transistors (IGBTs) configured to generate an output to excite the power generating system, and a nonlinear resistor configured to limit a voltage of the DC link to a predetermined threshold.

A system includes an enclosure. The enclosure includes an excitation system configured to regulate one or more outputs of a power generating system. The controller includes a power conversion module (PCM). The PCM includes a direct current (DC) link and a plurality of insulated gate bipolar transistors (IGBTs) configured to generate an output to excite the power generating system. The controller further includes a power output module (POM). The POM includes a nonlinear resistor configured to limit a voltage of the DC link to a predetermined threshold.

A system includes an excitation system, a power conversion module (PCM), and a power output module (POM) configured to regulate one or more outputs of a generator system. The POM includes contactors to isolate the power output and optionally to select among multiple PCMs in a redundant configuration, and a nonlinear resistor configured to detect one or more voltage values associated with a direct current (DC) link of the PCM, and limit the one or more voltage values of the DC link to a predetermined threshold when the detected one or more voltage values exceeds a characteristic threshold of the nonlinear resistor.

DRAWINGS

These and other features, aspects, and advantages of the present invention will become better understood when the following detailed description is read with reference to the accompanying drawings in which like characters represent like parts throughout the drawings, wherein.

Figure 2:
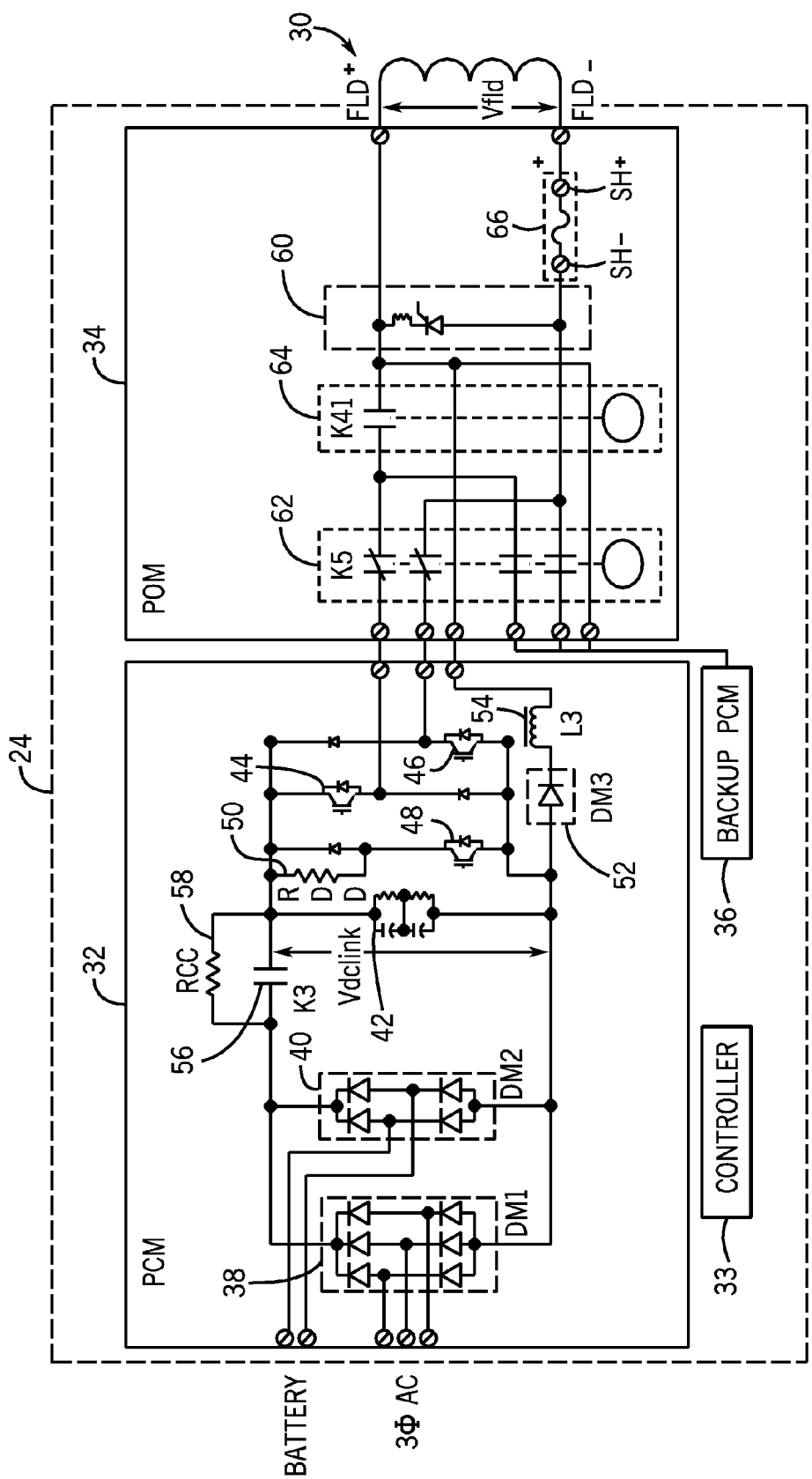
FIG. 2 is a schematic diagram of an embodiment of an excitation system included in the system of FIG. 1 including a controller, power conversion module (PCM) and a power output module (POM) in accordance with present embodiments.
Figure 3:
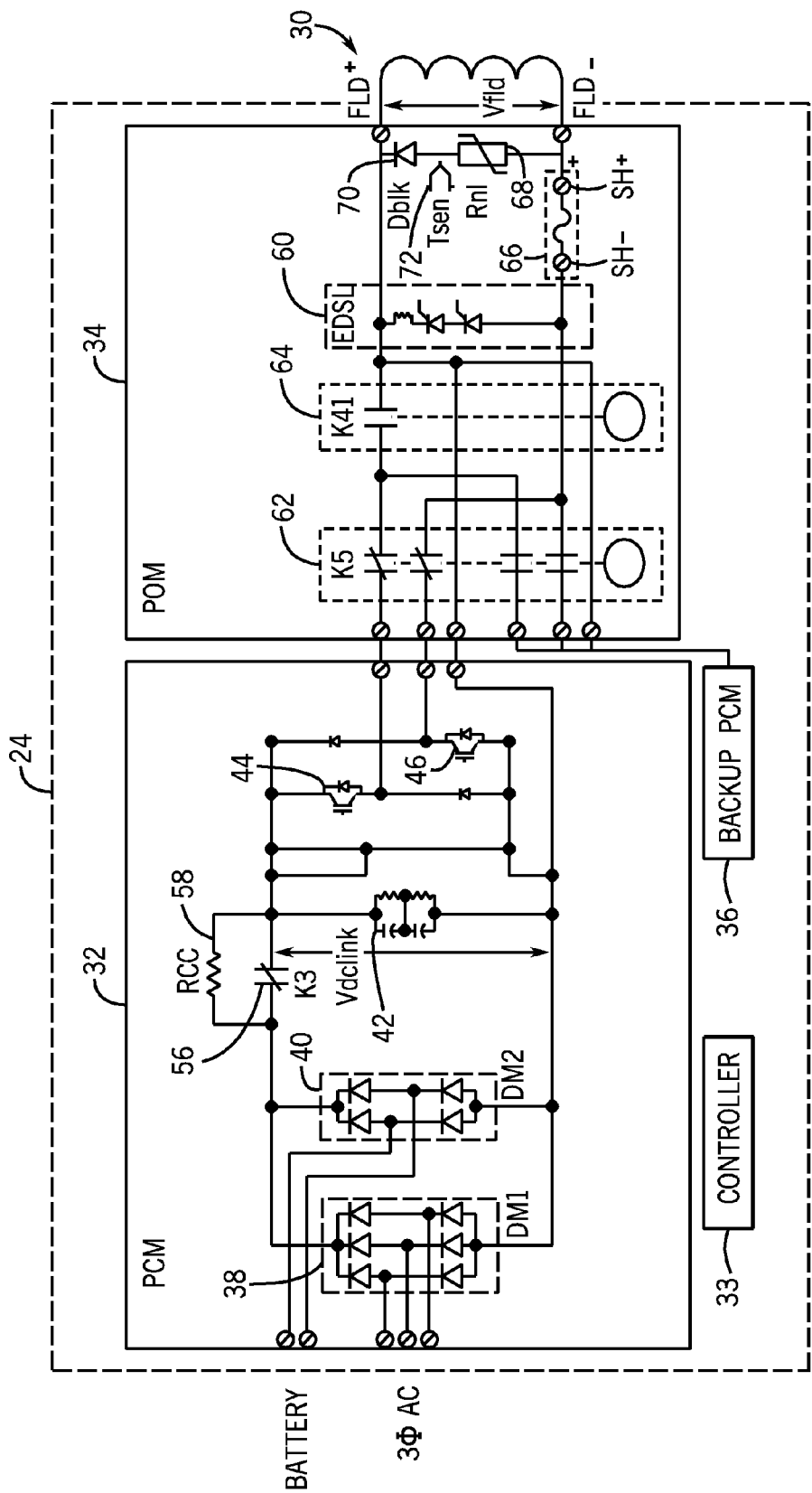
Figure 4:
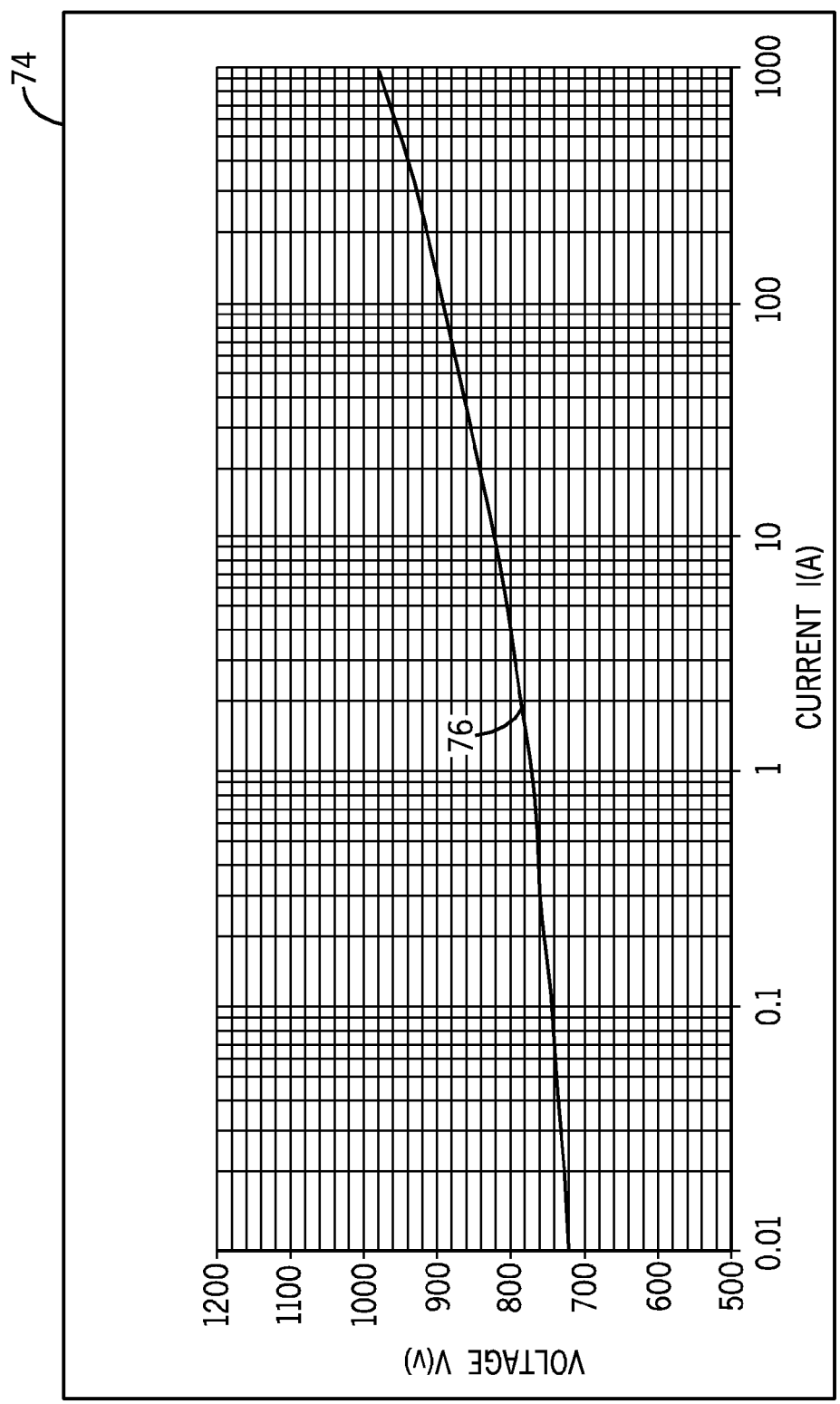

FIG. 3 is a schematic diagram of an embodiment of the excitation system of FIG. 2 including the controller, the power conversion module (PCM), the power output module (POM), and a nonlinear resistor device in accordance with present embodiments; and FIG. 4 is a plot diagram illustrating an embodiment of the current and voltage characteristics of the nonlinear resistor device of FIG. 3 in accordance with present embodiments.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Certain energy and power generating systems, such as generators and distributed generators (e.g., photovoltaic panels and wind turbines), electronic power supplies, and electronic motor drives, may rely on power converters to perform various power conversion, control, and/or management operations, such as magnetic field excitation and voltage regulation. Field excitation systems may include several configurations to provide control flexibility, but often include Insulated Gate Bipolar Transistors (IGBTs) and one or more Direct Current (DC) links to provide power output to, for example, the field of a generator of a power generating system. During periods of power inversion or de-excitation of the power generating system, or during abnormal operating conditions such as electrical faults on the utility grid, the DC link may be susceptible to overvoltage damage. Particularly, energy from the utility grid may be coupled back to the one or more DC links, charging it to unsustainably high voltages. Thus, various components may be included in the excitation system to protect the one or more DC links from overvoltage damage. However, the various components may adversely contribute to complexity and power consumption of the excitation system.

Accordingly, present embodiments relate to systems and methods useful in detecting and limiting the voltage of the DC link. In one embodiment, an excitation system includes a nonlinear resistor, which may detect if the voltage of the DC link reaches a lower voltage threshold of the nonlinear resistor 68, and decrease its resistance value to draw and dissipate energy that may otherwise overcharge the DC link. Thus, the nonlinear resistor may limit the voltage of the DC link to, or below its maximum operating voltage level. Furthermore, in other embodiments, the nonlinear resistor may be communicatively coupled to a diode and a thermal sensor. The diode may reduce a current associated with the nonlinear resistor. The thermal sensor may detect an operating temperature of the nonlinear resistor. Although the disclosed embodiments may be discussed with respect to a generator and exciter system, it should be appreciated that the disclosed embodiments may be applicable to any of a variety of power converter applications, such as motor drive systems, power supply systems, and so forth.

Figure 1:
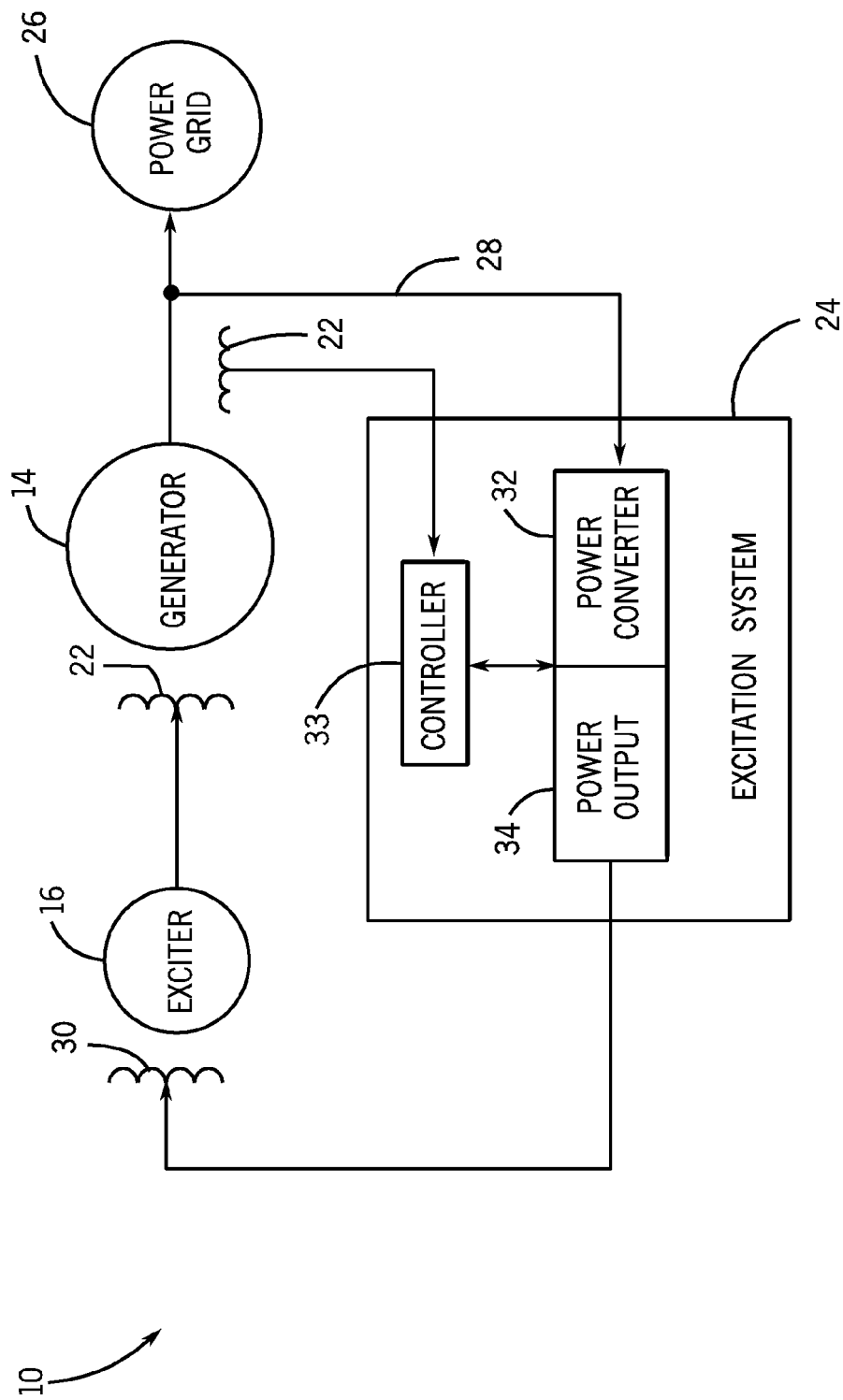
FIG. 1 is a block diagram of an embodiment of a power generating system in accordance with present embodiments.

With the foregoing in mind, it may be useful to describe an embodiment of a power generating system, such as an example power generating system 10 illustrated in FIG. 1. The power generating system 10 may include various subsystems such as a generator 14 and a rotating generator exciter 16. The generator 14 may be communicatively coupled to the exciter 16. As depicted, the output terminals of the generator 14 may be coupled to a large scale utility power grid 26. Alternatively, the output terminals of the generator 14 may be coupled to a small industrial power generation plant. For example, in some embodiments, the power generating system 10 may instead include an electrical motor drive, and the power grid 26 may be replaced by mechanical loads (e.g., compressors and/or turbines).

The generator exciter 16 may be included in the power generating system 10 to provide a direct current (DC) to the field windings 22 of the generator 14. Particularly, a DC field current (i.e., the current utilized by the field windings 22 of the generator 14 and/or a motor to establish a magnetic field for operation) may be included to excite the magnetic field of the generator 14. For example, the generator exciter 16 shown is a rotating (e.g., brush and/or brushless) exciter. In other embodiments, the rotating exciter 16 may be omitted and the output of the excitation system 24 directly energizes the field windings 22.

The power generating system 10 may also include an excitation system 24, which may provide various control parameters to each of the generator 14 and the exciter 16. In certain embodiments, the excitation system 24 may function as an excitation control for the generator 14 and the exciter 16. That is, the excitation system 24 may include one or more controllers 33 (e.g., processors), one or more power conversion modules that receive alternating current (AC) power, DC power, or a combination thereof from a source such as, for example, a power grid 26. The excitation system 24 may receive this power via a bus 28, and may provide power, control, and monitoring to the field windings 30 of the exciter 16 based thereon. Thus, the excitation system 24 and the exciter 16 may operate collectively to drive the generator 14 in accordance with a desired output (e.g., grid voltage, power factor, and so forth). As will be further appreciated, the excitation system 24 may include a power conversion module (PCM) and a power output module (POM) to regulate various outputs of the power generating system 10. For example, the excitation system 24 may be an excitation controller system, such as the EX2100e™ regulator, available from General Electric Co., of Schenectady, N.Y.

FIG. 2 is a schematic diagram of one embodiment of the excitation system 24 described above. The controller 33 of the excitation system 24 may include code or instructions stored in a non-transitory machine-readable medium (e.g., memory and/or other storage) and executed, for example, by one or more processors that may be included in the controller 33. Additionally, the excitation system 24 may be enclosed (e.g., illustrated by the dashed line) inside, for example, a finished cabinet, such that the excitation system 24 may be panel mounted or retrofitted as a standalone and/or integrated system. As further depicted in FIG. 2, the excitation system 24 may include a PCM 32, a POM 34, and an auxiliary PCM 36 (e.g., Backup PCM) each communicatively coupled to one another as well as, for example, to the field windings 30 of the exciter 16. More particularly, the excitation system 24 may include a system of integrated power electronic switching devices such as silicon-controlled rectifiers (SCRs), thyristors, insulated gate bipolar transistors (IGBTs), and so forth, which may be used to switch from "ON" (e.g., activated and/or enabled) and "OFF" (e.g., deactivated and/or disabled) states to control the voltage and/or current supplied to excite the field windings 30 of the exciter 16.

As the excitation system 24 may receive power via an AC or DC power source, in certain embodiments, the PCM 32 may include a three-phase diode bridge 38 (e.g., DM1) and a diode bridge 40 (e.g., DM2). The three-phase bridge 38 may be included to rectify an incoming three-phase AC power signal, while the diode bridge 40 may be included as a DC-to-DC coupler. For example, in addition to, or alternative to, receiving AC power via the power grid 26, the excitation system 24 may also receive power via a battery power supply (e.g., Battery). In certain embodiments, the PCM 32 may also include a DC link 42, which may include one or more capacitors, and may be used as an intermediate circuit to couple the DC voltage (e.g., $V_{DC\ Link}$) of the PCM 32 and the DC voltage (e.g., $V_{Fld}$) of the field windings 30 to substantially the same value. Such a case, specifically when the voltage (e.g., $V_{DC\ Link}$) substantially equals the voltage (e.g., $V_{Fld}$), may be referred to herein as a "forward voltage mode." The PCM 32 may generally include a power input section (e.g., AC or DC power received via the grid 24), the DC link 42, and a number of IGBTs 44, 46, and 48 to provide an output DC voltage to the POM 34, and by extension, the field windings 30 of the exciter 16. Specifically, the IGBTs 44 and 46 may be switched "ON" (e.g., in the forward voltage mode) to generate a pulse-width modulated (PWM) DC output power for excitation of the field windings 30 based on, for example, a pulsed DC power (e.g., voltage and current) signal received from the three-phase diode bridge 38 and/or diode bridge 40.

On the other hand, during power inverting of the exciter 16 (e.g., during a period the IGBTs 44 and 46 are each switched "OFF"), which may also be referred to herein as a "reverse voltage mode," the energy of the field windings 30 may flow into the DC link 42 and may overcharge the capacitors of the DC link 42 to an unsustainable voltage level. Accordingly, in such a case, the IGBT 48 may be provided to discharge the capacitors of the DC link 42 into a resistor 50 (e.g., RDD). In certain embodiments, for example, during de-excitation of exciter 16, the IGBT 48 may discharge the capacitors of the DC link 42 through a diode (e.g., DM3) 52 and inductor (e.g., L3) 54. Similarly, a relay 56 (e.g., K3) may be included in the PCM 32 to bypass a DC link-charging resistor 58 (e.g., RCC) when the relay 56 is in the closed position. Otherwise, the DC link-charging resistor 58 may provide a soft charge during the initial power up for the capacitors of the DC link 42. The excitation system 24 may also operate in a "non-operating mode" (e.g., power down mode) during, for example, periods of power outages. As will be further appreciated, a number of the aforementioned components (e.g., the IGBT 48, resistor 50, the diode 52, the inductor 54, and so forth) of the PCM 32 may be removed from the PCM 32 to reduce, for example, complexity and power consumption of the excitation system 24.

As previously discussed, the excitation system 24 may also include the POM 34. Particularly, certain power components that vary depending on the application, redundancy requirements, and current regulation requirements of the excitation system 24 may be included in the POM 34. For example, the POM 34 may include a dual control selector board 60 for dual redundant applications of the excitation system 24. The board 60 may be used to control a transfer contactor 62 (e.g., K5). The transfer contactor 62 may be used to select between the PCM 32 and the auxiliary PCM 36 (e.g., Backup PCM) to connect to the field windings 30 based on received control signals. For example, the transfer contactor 62 may switch from open to closed, or from closed to open, to connect or disconnect one of the PCM 32 or the auxiliary PCM 36 (e.g., Backup PCM) to the POM 34. Further during the switching time of the transfer contactor 62, the board 60 may provide an alternate path through the SCRs of the board 60 for circulation of field current during transfer to prevent arcing in the contactor 62. The POM 34 may also include a field current interrupting DC contactor 64 (e.g., K41), which may be used to disconnect the excitation system 24 from the terminals of the exciter field windings 30. Particularly, the DC field contactor 64 may provide an internal field breaker function to remove stored energy in the exciter field windings 30 during events such as de-excitation of the field windings 30, and by extension the exciter 16 and the generator 14. The shunt 66 may provide a field current feedback to the controller 33 for regulating the output of the excitation system 24.

The PCM 32 and POM 34, as depicted in FIG. 2, may include also a generation of control power from the DC link 42, since the excitation system 24 may be expected to function when external control power (e.g., AC and/or DC power received via the grid 26) may be unavailable. As previously discussed, the PCM 32 may also include the IGBT 48 to discharge the capacitors of the DC link 42, the resistor 50 (e.g., RDD) to dissipate the discharge current from the IGBT 48, as well other circuitry such as overvoltage sensing circuitry and a gate drive to control the IGBT 48. For events such as, for example, an emergency de-excitation of the exciter 16 and/or the generator 14, the DC field contactor 64 (e.g., K41) may be tripped open, and the diode 52 (e.g., DM3) and the inductor 54 (e.g., L3) may then be included to provide a de-excitation current path around the DC field contactor 64. If the DC field contactor 64 isolates both poles (e.g., positive and negative) of the DC output to the field windings 30 of the exciter 16, additional similar components (e.g., diode 52 and inductor 54) may again be included to bypass each pole of the DC output. Such a complex configuration may reduce the effectiveness of the DC field contactor 64 in isolating the exciter 16, and particularly the field windings 30 of the exciter 16, from the excitation system 24, increase the complexity, size, and cost of the excitation system 24, as well as decrease reliability of the excitation system 24. Nevertheless, it should be appreciated that the PCM 32 and the POM 34 as depicted in FIG. 2 may represent only one embodiment of the excitation system 24.

Accordingly, as illustrated in FIG. 3, present embodiments of the excitation system 24 may include one or more nonlinear resistors 68 (e.g., Rnl) connected across the field windings 30 of exciter 16 field to passively limit the DC voltage (e.g., $V_{DC\ Link}$) of the DC link 42. The nonlinear resistor 68 may be any resistance device, in which its resistance varies based on physical characteristics such as voltage, current, temperature, and so forth. For example, in certain embodiments, the nonlinear resistor 68 may include a varistor (e.g., variable resistor), a thermistor, a voltage dependent resistor (VDR), a positive temperature coefficient (PTC) resistor, a negative temperature coefficient (NTC) resistor, or any combination thereof. The nonlinear resistor 68 may be constructed of various materials, including, for example, semiconductors such as silicon carbide (SiC) and metal oxides such as zinc oxide (ZnO). In certain embodiments, the nonlinear resistor may be included within the POM 34 of the excitation system 24, but may also be included in the PCM 32 or external to the excitation system 24. By including the nonlinear 68 to limit (e.g., electrically clamp) the voltage (e.g., $V_{DC\ Link}$) of the DC link 42, the use of added circuitry such as the IGBT 48, the resistor 50 (e.g., RDD), the diode 52 (e.g., DM3), the inductor 54 (e.g., L3), and similar overvoltage sensing and gate drive circuitry as discussed above with respect to FIG. 2, may be obviated by the addition of a single nonlinear resistor 68.

In certain embodiments, specifically, under normal operating conditions (e.g., in the forward voltage mode) of the DC link 42, the resistance of the nonlinear resistor 68 may remain at a high value (e.g., value of the maximum resistance of the nonlinear resistor 68), so as to approximately restrict any current from flowing through the nonlinear resistor 68. However, during events such as inverting or de-excitation of the exciter 16, field current from the field windings 30 may charge the capacitors of the DC link 42 above the normal operating voltages of the DC link 42. The nonlinear resistor 68 may detect if the voltage (e.g., $V_{DC\ Link}$) of the DC link 42 reaches a lower voltage threshold (or other physical characteristic threshold such as a temperature threshold) of the nonlinear resistor 68, and decrease its resistance value to draw and dissipate the field current that may otherwise overcharge the DC link 42. Thus, the nonlinear resistor 68 may limit (e.g., electrically clamp) the voltage (e.g., $V_{DC\ Link}$) of the DC link 42 to, or below its maximum operating voltage level. Further, it should be appreciated that the nonlinear resistor 68 may protect the DC link 42 even if the excitation system 24 is not powered down, for example, during a power outage. As noted above, by including the single nonlinear resistor 68 for overvoltage and field de-excitation control of the exciter 16 and/or generator 14, the presence of devices such as the IGBT 48, the resistor 50 (e.g., RDD), the diode 52 (e.g., DM3), the inductor 54 (e.g., L3), overvoltage sensing and gate drive circuitry, an added power supply, and other components associated with discharging circuitry may be eliminated. Furthermore, the simpler embodiment of the excitation system 24 may lower power requirements of the excitation system 24 (e.g., PCM 32 and POM 34). In another embodiment, the nonlinear resistor 68 may also allow the excitation system 24 to provide a forward voltage crowbar function, and thus provide more robust control of the exciter 16 and/or the generator 14, with no additional components.

In one embodiment, communicatively coupled to the nonlinear resistor 68 may be a diode 70 (e.g., $D_{blk}$). The diode 70 may be provided to reduce leakage dissipation current that may become present in the nonlinear resistor 68 during the forward voltage mode of the PCM 32. The nonlinear resistor 68 may also include a communicatively coupled thermal sensor 72 ($T_{sen}$), which may be used to monitor the operating temperature of the nonlinear resistor 68, and specifically determine when the nonlinear resistor 68 is nearing its maximum operating temperature and/or when the nonlinear resistor 68 is operating under abnormal temperature conditions. It should be appreciated that the thermal sensor 72 may include any temperature sensor such as thermocouples, resistance temperature detectors (RTDs), thermistors, and so forth.

Turning now to FIG. 4, a current-voltage (IV) plot 74 illustrates the current and voltage characteristics of the nonlinear resistor 68. As illustrated by line 76, in one embodiment, the nonlinear resistor 68 may be rated up to, for example, 1200 volts (V) or 1000 amps (A), and may limit (e.g., clamp) the voltage (e.g., $V_{DC\ Link}$) of the DC link 42, for example, up to approximately 950V. For example, as discussed above with respect to FIG. 3, the nonlinear resistor 68 may detect if the voltage (e.g., $V_{DC\ Link}$) of the DC link 42 rises above a rated threshold (e.g., 900V). The resistance of the nonlinear resistor 68 may then be decreased to allow the nonlinear resistor 68 to draw and dissipate current that may otherwise overcharge the DC link 42. That is, as illustrated by line 76, the resistance of the nonlinear resistor 68 may vary with the voltage and/or current of the DC link 42. In other embodiments, the nonlinear resistor 68 may limit the voltage (e.g., $V_{DC\ Link}$) of the DC link 42 to approximately a higher (e.g., 960V) and/or lower (e.g., 720V) voltage limit depending on, for example, the maximum voltage rating of the DC link 42 and/or another voltage threshold valued configured by the user. However, it should be appreciated that the current-voltage (IV) plot 74 is included merely as one example. In other embodiments, the resistance of the nonlinear resistor 68 may, instead of voltage and/or current, be dependent upon other physical characteristics such as temperature, light, and/or other similar physical characteristics.

Technical effects of the disclosed embodiments include systems and methods useful in detecting and limiting the voltage of the DC link. In one embodiment, an excitation system includes a nonlinear resistor, which may detect if the voltage of the DC link reaches a lower voltage threshold of the nonlinear resistor, and decrease its resistance value to draw and dissipate energy that may have otherwise overcharged the DC link. Thus, the nonlinear resistor may limit of the DC link to, or below its maximum operating voltage level. Furthermore, in other embodiments, the nonlinear resistor may be communicatively coupled to a diode and a thermal sensor. The diode may reduce a current associated with the nonlinear resistor. The thermal sensor may detect an operating temperature of the nonlinear resistor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an excitation system configured to regulate one or more outputs of a power generating system, wherein the excitation system comprises:
a power conversion module (PCM) comprising:
a direct current (DC) link;
a plurality of insulated gate bipolar transistors (IGBTs) configured to generate an output to excite the power generating system; and
a nonlinear resistor configured to limit a voltage of the DC link to a predetermined threshold when the excitation system is operating in a reverse voltage mode or in a non-operating mode each distinct from operation of the excitation system in a forward voltage mode.

2. The system of claim 1, wherein the predetermined threshold is less than or equal to a maximum voltage rating of the DC link.

3. The system of claim 1, wherein the excitation system further comprises a power output module (POM) communicatively coupled to the nonlinear resistor.

4. The system of claim 3, wherein the POM comprises a diode communicatively coupled to the nonlinear resistor, wherein the diode is configured to reduce a current associated with the nonlinear resistor.

5. The system of claim 3, wherein the POM comprises a thermal sensor communicatively coupled to the nonlinear resistor, wherein the thermal sensor is configured to detect an operating temperature of the nonlinear resistor.

6. The system of claim 1, wherein the nonlinear resistor is configured to singularly protect the DC link from over-voltage damage.

7. The system of claim 1, wherein the nonlinear resistor is configured to limit the voltage of the DC link up to a user-configurable voltage threshold value.

8. The system of claim 1, wherein the excitation system is configured to operate in the forward voltage mode, the reverse voltage mode, and the non-operating mode, wherein, in the forward voltage mode, the nonlinear resistor is configured to sustain a first resistance value, and in the reverse voltage mode and the non-operating mode, the nonlinear resistor is configured to sustain a second resistance value to limit the voltage of the DC link.

9. The system of claim 8, wherein the nonlinear resistor is configured to sustain the second resistance value when the voltage of the DC link exceeds a lower voltage threshold of the nonlinear resistor.

10. The system of claim 8, wherein the second resistance value of the nonlinear resistor is less than the first resistance value of the nonlinear resistor.

11. The system of claim 1, wherein the nonlinear resistor comprises a varistor, a thermistor, a positive temperature coefficient (PTC) resistor, or a negative temperature coefficient (NTC) resistor.

12. A system, comprising:
an enclosure, comprising:
an excitation system configured to regulate one or more voltages of a power generating system, wherein the excitation system comprises:
a power conversion module (PCM) comprising:
a direct current (DC) link;
a plurality of insulated gate bipolar transistors (IGBTs) configured to generate an output to excite the power generating system; and
a power output module (POM) comprising a nonlinear resistor configured to limit a voltage of the DC link to a predetermined threshold when the excitation system is operating in a reverse voltage mode or in a non-operating mode each distinct from operation of the excitation system in a forward voltage mode.

13. The system of claim 12, wherein the POM comprises a diode communicatively coupled to the nonlinear resistor, wherein the diode is configured to reduce a current associated with the nonlinear resistor during the forward voltage mode.

14. The system of claim 12, wherein the POM comprises a thermal sensor communicatively coupled to the nonlinear resistor, wherein the thermal sensor is configured to detect an operating temperature of the nonlinear resistor.

15. The system of claim 12, wherein the nonlinear resistor is configured to singularly protect the DC link from overvoltage damage.

16. The system of claim 12, wherein the excitation system is configured to operate in a forward voltage mode, a reverse voltage mode, and a non-operating mode, wherein, in the forward voltage mode, the nonlinear resistor is configured to sustain a first resistance value, and in the reverse voltage mode and the non-operating mode, the nonlinear resistor is configured to sustain a second resistance value to limit the voltage of the DC link.

17. The system of claim 16, wherein the nonlinear resistor is configured to sustain the second resistance value when the voltage of the DC link exceeds a lower voltage threshold of the nonlinear resistor.

18. A system, comprising:
an excitation system comprising a power conversion module (PCM) and a power output module (POM) configured to regulate one or more outputs of a power generating system, wherein the POM includes a nonlinear resistor configured to:
detect one or more voltage values associated with a direct current (DC) link of the PCM; and
limit the one or more voltage values of the DC link to a predetermined threshold when the detected one or more voltage values exceeds a characteristic threshold of the nonlinear resistor in a reverse voltage mode or in a non-operating mode each distinct from operation of the excitation system in a forward voltage mode.

19. The system of claim 18, wherein the POM comprises a diode and a thermal sensor communicatively coupled to the nonlinear resistor, and wherein the diode is configured to reduce a current associated with the nonlinear resistor, and wherein the thermal sensor is configured to detect an operating temperature of the nonlinear resistor.

20. The system of claim 18, wherein the nonlinear resistor comprises a varistor, a thermistor, a positive temperature coefficient (PTC) resistor, or a negative temperature coefficient (NTC) resistor, and wherein the characteristic threshold comprises a voltage threshold, a current threshold, or a temperature threshold.

* * * * *